(12) United States Patent
Seshadri et al.

(10) Patent No.: US 10,200,386 B2
(45) Date of Patent: *Feb. 5, 2019

(54) INTELLIGENT WEB PAGE CONTENT BLOCKING

(71) Applicant: Microsoft Technology Licensing, LLC, Redmond, WA (US)

(72) Inventors: Aravind Seshadri, Redmond, WA (US); Patrick Plaisted, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/692,978

(22) Filed: Aug. 31, 2017

(65) Prior Publication Data

US 2018/0027000 A1   Jan. 25, 2018

Related U.S. Application Data

(63) Continuation of application No. 14/311,107, filed on Jun. 20, 2014, now Pat. No. 9,781,135.

(51) Int. Cl.
*H04L 29/06* (2006.01)
*G06F 17/30* (2006.01)
*H04L 29/08* (2006.01)

(52) U.S. Cl.
CPC .... *H04L 63/1416* (2013.01); *G06F 17/30899* (2013.01); *H04L 63/1458* (2013.01); *H04L 67/02* (2013.01)

(58) Field of Classification Search
CPC . H04L 63/1416; H04L 63/1458; H04L 67/02; G06F 17/30899
See application file for complete search history.

(56) References Cited

U.S. PATENT DOCUMENTS 5,724,521 A * 3/1998 Dedrick ................. G06Q 30/02
  705/26.1
5,740,549 A * 4/1998 Reilly ................ G06Q 30/0243
  705/14.42

(Continued)

FOREIGN PATENT DOCUMENTS

| KR | 1020080100597 A | 11/2008 |
| WO | 2008157322 A | 12/2008 |
| WO | 2012022044 A1 | 2/2012 |

OTHER PUBLICATIONS

Parmar et al., "Removal od Image Advetisement from Web Page", Aug. 2011, pp. 1-5.*

(Continued)

*Primary Examiner* — Yonas A Bayou
(74) *Attorney, Agent, or Firm* — Wade IP Law LLC

(57) ABSTRACT

Systems and methods for efficient downloading and rendering of a web page on a network connected processing device are provided. A per-page manifest specifies a list of blocked resources specific to the web page is provided. When a page is requested by the network connected processing device, blocked resources defined in the manifest are not retrieved via the network and hence not rendered by the processing device. Manifests are defined on a per-page basis. In one embodiment, manifests are created or retrieved with each request.

20 Claims, 8 Drawing Sheets

(56) References Cited

U.S. PATENT DOCUMENTS

| | | | | |
|---|---|---|---|---|
| 5,848,396 | A | * | 12/1998 | Gerace .................. G06Q 30/02 705/7.33 |
| 5,848,397 | A | * | 12/1998 | Marsh .................. G06Q 10/107 705/14.61 |
| 5,948,061 | A | * | 9/1999 | Merriman .............. G06Q 30/02 705/14.53 |
| 6,026,368 | A | * | 2/2000 | Brown .................. G06Q 30/02 705/14.56 |
| 6,144,944 | A | * | 11/2000 | Kurtzman, II ......... G06Q 30/02 705/1.1 |
| 6,401,075 | B1 | * | 6/2002 | Mason .................. G06Q 30/02 705/14.72 |
| 6,701,350 | B1 | | 3/2004 | Mitchell |
| 6,742,047 | B1 | | 5/2004 | Tso |
| 6,985,882 | B1 | * | 1/2006 | Del Sesto .............. G06Q 30/02 705/27.1 |
| 7,039,599 | B2 | * | 5/2006 | Merriman .............. G06Q 30/02 705/14.52 |
| 7,395,355 | B2 | | 7/2008 | Afergan et al. |
| 7,792,994 | B1 | | 9/2010 | Hernacki |
| 7,937,478 | B2 | | 5/2011 | Cheng et al. |
| 7,975,071 | B2 | | 7/2011 | Ramjee et al. |
| 8,060,613 | B2 | | 11/2011 | Farber et al. |
| 8,239,263 | B2 | * | 8/2012 | Axe ....................... G06Q 30/02 705/14.4 |
| 8,281,361 | B1 | | 10/2012 | Schepis et al. |
| 8,301,168 | B2 | | 10/2012 | Zubas et al. |
| 8,527,504 | B1 | | 9/2013 | Krishnamurthy |
| 2001/0047297 | A1 | * | 11/2001 | Wen ....................... G06Q 30/02 705/14.55 |
| 2002/0016828 | A1 | | 2/2002 | Daugherty et al. |
| 2007/0271385 | A1 | | 11/2007 | Davis et al. |
| 2008/0065745 | A1 | | 3/2008 | Leighton et al. |
| 2010/0312821 | A1 | | 12/2010 | Bannoura et al. |
| 2012/0226766 | A1 | | 9/2012 | Fainberg et al. |
| 2012/0254720 | A1 | | 10/2012 | Hamm et al. |
| 2012/0303451 | A1 | * | 11/2012 | Axe ....................... G06Q 30/02 705/14.49 |
| 2013/0318197 | A1 | | 11/2013 | Plaisted et al. |
| 2013/0318208 | A1 | | 11/2013 | Seshadri et al. |

OTHER PUBLICATIONS

Parmar et al., "Removal od Image Advetisement from Web Page", Aug. 2011, pp. 1 -5 (Year: 2011).*
Parmar et al., "Removal od Image Advertisement from Web Page", Aug. 2011, pp. 1-5.
International Preliminary Report on Patentability dated Sep. 22, 2016 in International Patent Application No. PCT/US2015/036553, 14 pages.
Second Written Opinion issued in PCT Application No. PCT/US2015/036553, dated May 25, 2016, 5 pages.
Response to Written Opinion filed Dec. 15, 2015 in International Patent Application No. PCT/US2015/036553, 11 pages.
International Search Report & Written Opinion received for PCT Application No. PCT/US2015/036553, dated Sep. 10, 2015, 10 pages.
Raj, et al., "Personalized Web-page Rendering System," in Proceedings of International Conference on Management of Data COMAD 2008, Dec. 17, 2008 pp. 30-39.
Xiao, et al., "Web Page Adaptation for Mobile Device," in Proceedings of 4th International Conference on Wireless Communications, Networking and Mobile Computing, Oct. 12, 2008, 5 pages.
"How Mobicip Works," retrieved on: Jun. 27, 2013, available at http://www.mobicip.com/resources/how_it_works.
U.S. Appl. No. 13/831,844, filed Mar. 15, 2013.
U.S. Appl. No. 13/480,498, filed May 29, 2012.
"Riverbed Stingray Product Family," retrieved at «http://www.riverbed.com/assets/media/documents/brochures/ProductBrochure_Stingray_Product_Family.pdf», retrieved date: Nov. 20, 2012, pp. 8.
Darragh, Jim, "Comment: Preparing for website traffic peaks," retrieved at «http://www.retail-week.com/comment/efashion-blog/comment-prepating-for-website-traffic-peaks/5037443.article», Jun. 20, 2012, pp. 2.
Anderson, Rick, "Bundling and Minification," retrieved at «http://www.asp.net/mvc/tutorials/mvc-4/bundling-and-minification», Aug. 23, 2012, pp. 9.
"Optimize caching," retrieved at «https://developers.google.com/speed/docs/best-practices/caching», retrieved date: Nov. 20, 2012, pp. 4.
Balliauw, Maarten, "Using the Windows Azure Content Delivery Network," retrieved at «http://acloudyplace.com/2012/04/using-the-windows-azure-content-delivery-network/», Apr. 5, 2012, pp. 6.
Armstrong, Nicholas D.R., "Just-In-Time Push Prefetching: Accelerating the Mobile Web," retrieved at «http://www.uwspace.uwaterloo.ca/bitstream/10012,6256/1/Armstrong_Nicholas.pdf», In the Theses and Dissertations of Faculty of Engineering, Mar. 11, 2011, pp. 101.
Dong, et al., "Proxy-based Object Packaging and Compression: A Web Acceleration Scheme for UMTS," retrieved at «http://ieeexplore.ieee.org/stamp/stamp.jsp?tp=8,arnumber=5303682», In the proceeding of 5th International Conference on Wireless Communications, Networking and Mobile Computing, Sep. 24, 2009, pp. 5.
Non-Final Rejection dated Nov. 2, 2015 in U.S. Appl. No. 14/311,107.
Amendment dated Mar. 2, 2016 in U.S. Appl. No. 14/311,107.
Final Rejection dated May 2, 2016 in U.S. Appl. No. 14/311,107.
Amendment dated Aug. 1, 2016 in U.S. Appl. No. 14/311,107.
Non-Final Rejection dated Sep. 6, 2016 in U.S. Appl. No. 14/311,107.
Amendment dated Dec. 6, 2016 in U.S. Appl. No. 14/311,107.
Final Rejection dated Mar. 13, 2017 in U.S. Appl. No. 14/311,107.
Amendment dated May 15, 2017 in U.S. Appl. No. 14/311,107.
Notice of Allowance and Fees Due dated Jun. 1, 2017 in U.S. Appl. No. 14/311,107.

* cited by examiner

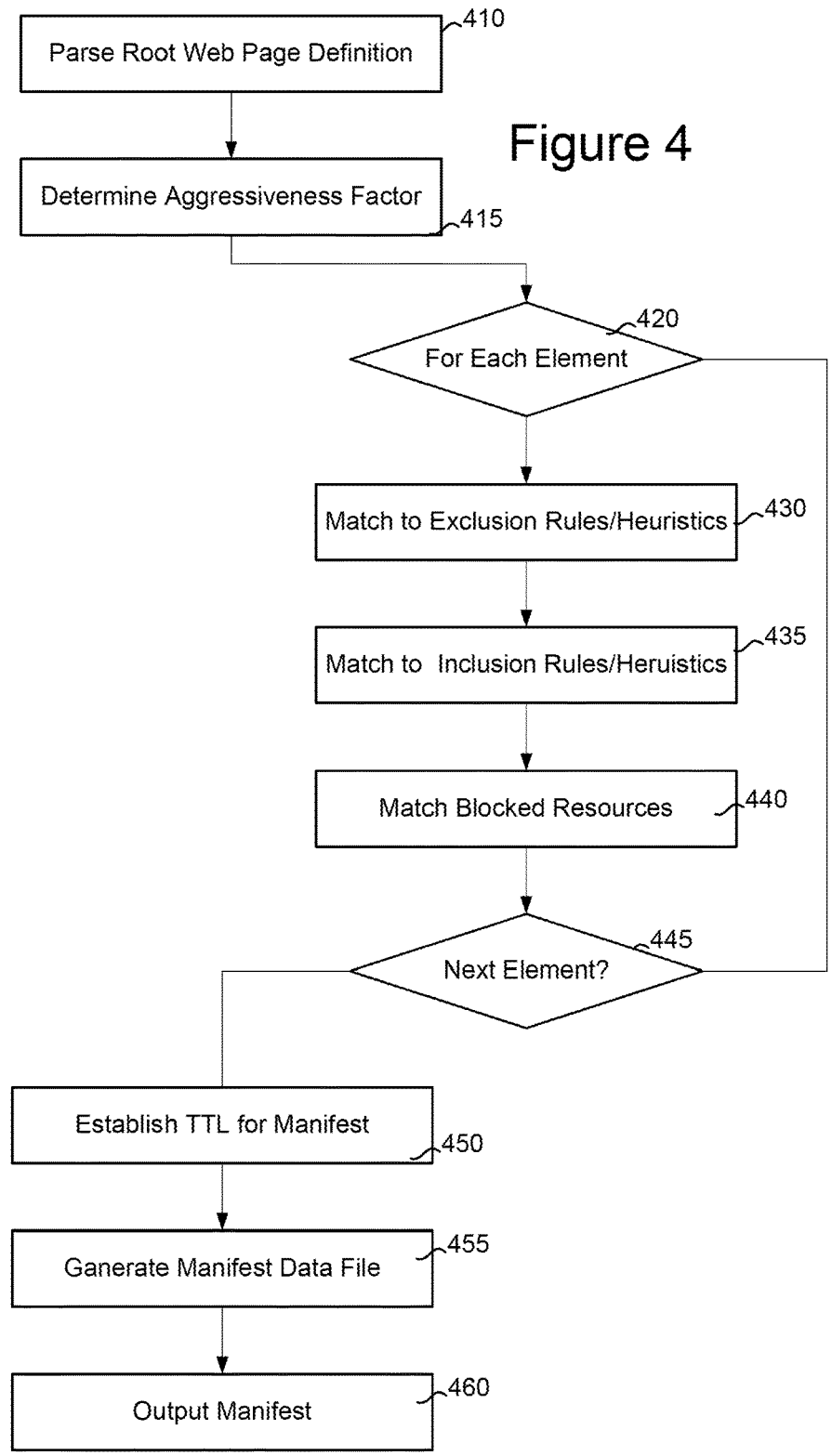

Figure 6

```
<PageManifest xmlns:i="http://www.w3.org/2001/
XMLSchema-instance">
    <UrlHash>6529a082ac6bdfb903413cc927dd08b0856e1998</
UrlHash>
    <UserAgentId>1</UserAgentId>
    <AcceptLanguage>en-US</AcceptLanguage>
    <Version>1</Version>
    <SequenceNumber>629</SequenceNumber>
602
    <DoNotRenderList>
        605    <Rules>
            <Value>^.*/ads/.*$</Value>
            <Value></Value>
        610   </Rules>
        <Domains>
            <Value>doubleclick.net</Value>
            <Value>ads.contoso.com</Value>
        620
        </Domains>
        <Extensions>
            <Value>exe</Value>
            <Value>mp3</Value>
            <Value>mpg</Value>
        </Extensions>
    </DoNotRenderList>
630
    <DoNotRenderOverrideList>
        640      <Rules>
            <Value>>^.*/montoso/ads/.*$</Value>
        </Rules>
        <Domains>
        650
            <Value>www.montoso.com</Value>
        </Domains>
    </DoNotRenderOverrideList>
</PageManifest>
```

INTELLIGENT WEB PAGE CONTENT BLOCKING

PRIORITY DATA

This application is a continuation of U.S. patent application Ser. No. 14/311,107 filed Jun. 20, 2014 entitled "INTELLIGENT WEB PAGE CONTENT BLOCKING", which application is incorporated herein by reference.

BACKGROUND

The speed at which content can be delivered to a network connected processing device is a function of the bandwidth of the connection, the speeds of the processing device and the delivery device, the latency between the client and server, and the size of the content to be delivered. When browsing the Web, some pages seek to deliver a relatively large amount of content, including text, images, videos and advertisements in their content. The content may be delivered from a variety of sources. Web content for to the mobile user attempts to address the needs of a wide-range of users and as a result the mobile devices are forced to download a lot of content data over the mobile networks. This leads to increased data costs for the user, browser rendering delays and other complexities of rendering the content on a smaller device screens. Several web pages try to build a mobile device version web page to reduce the amount of content relative to a normal web page. In many cases, this can lead to changed page layouts, missing quality content and images, and a loss of dynamisms expected by today's users of mobile devices.

SUMMARY

The technology, roughly described, comprises systems and methods for efficient downloading and rendering of a web page on a network connected processing device. A per-page manifest (data file) which specifies a list of blocked resources specific to the web page is provided. When a page is requested by a processing device, blocked resources defined in the manifest are not retrieved via the network and hence not rendered by the processing device. Manifests are defined on a per-page basis. In one embodiment, manifests are created or retrieved with each request In one embodiment, a processing device adapted to render a web page includes a user interface, a memory storing a manifest associated with a web page; and a processor. The processor may be programmed to receive a request to render the web page including plurality of elements available from a network source; retrieve a page manifest for the web page, block, in response to the manifest, at least one request for one of the plurality of elements in the web page; and render the web page with a subset of the plurality of elements on the user interface.

In another embodiment, a computer readable medium including code instructing a processor to perform a method is provided. The computer readable medium method includes receiving a request for a web page manifest, the manifest for a web page having a plurality of resources specified in the web page by reference to network addresses. The method further includes analyzing the web page to create a page manifest, the analyzing determining blocked and unblocked resources from a root definition of the web page specifying a plurality of resources; and generating the page manifest responsive to the analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a flow chart depicting a method for creating a manifest data file in accordance with the present technology.

FIG. 6 is an exemplary XML code snippet of a manifest.

DETAILED DESCRIPTION

Technology is described for efficient downloading and rendering of a web page on a network connected processing device. The technology improves bandwidth consumption relative to the retrieval of web page resources. A per-page manifest (data file) which specifies a list of blocked resources specific to the web page is provided. When a page is requested by a processing device, blocked resources defined in the manifest are not retrieved via the network and hence not rendered by the processing device. Because fewer resources are retrieved, a web page renders faster and the retrieval of the page (and its included resources) utilizes less network bandwidth. Manifests are defined on a per-page basis. In one embodiment, manifests are created with each request. In another embodiment, manifests have a time-to-live within which they may be used. The data file may be delivered dynamically at the beginning of a web page rendering allowing for instant updates to the list and at the same time keeping the control on a web service. The resource blocking on a per-web page advantageously provides individualized specifications of the type of elements which may be downloaded on each page and for each user. Content not relevant for a given page may turn out to be relevant on another web page.

In one embodiment, advertisement blocking may be identified by specifying a per-page manifest from a static block list and identifying a small subset of resources applicable for blocking specific. A static list, for example, may be kept for listing of advertisers. Such a static list may be maintained by an optimization service. The service provides manifests on request by a connected processing device and can build a list of known resources on a web page to create the manifest. The identified resources are sent to the network connected processing device client and the client uses a simple reduced list of blocking rules to perform the actual resource blocking on the processing device itself.

The technology improves loading speeds for web pages on processing devices, and in particular, mobile processing devices such as smart phones. For example, if one identifies that 50 out of the 200 resources that need to be fetched for a given web page are ads, then by skipping these downloads, one saves rendering time on the overall page not just by not having to fetch the bytes, but by also not having to wait for all the round trips to fetch these resources.

Figure 1:
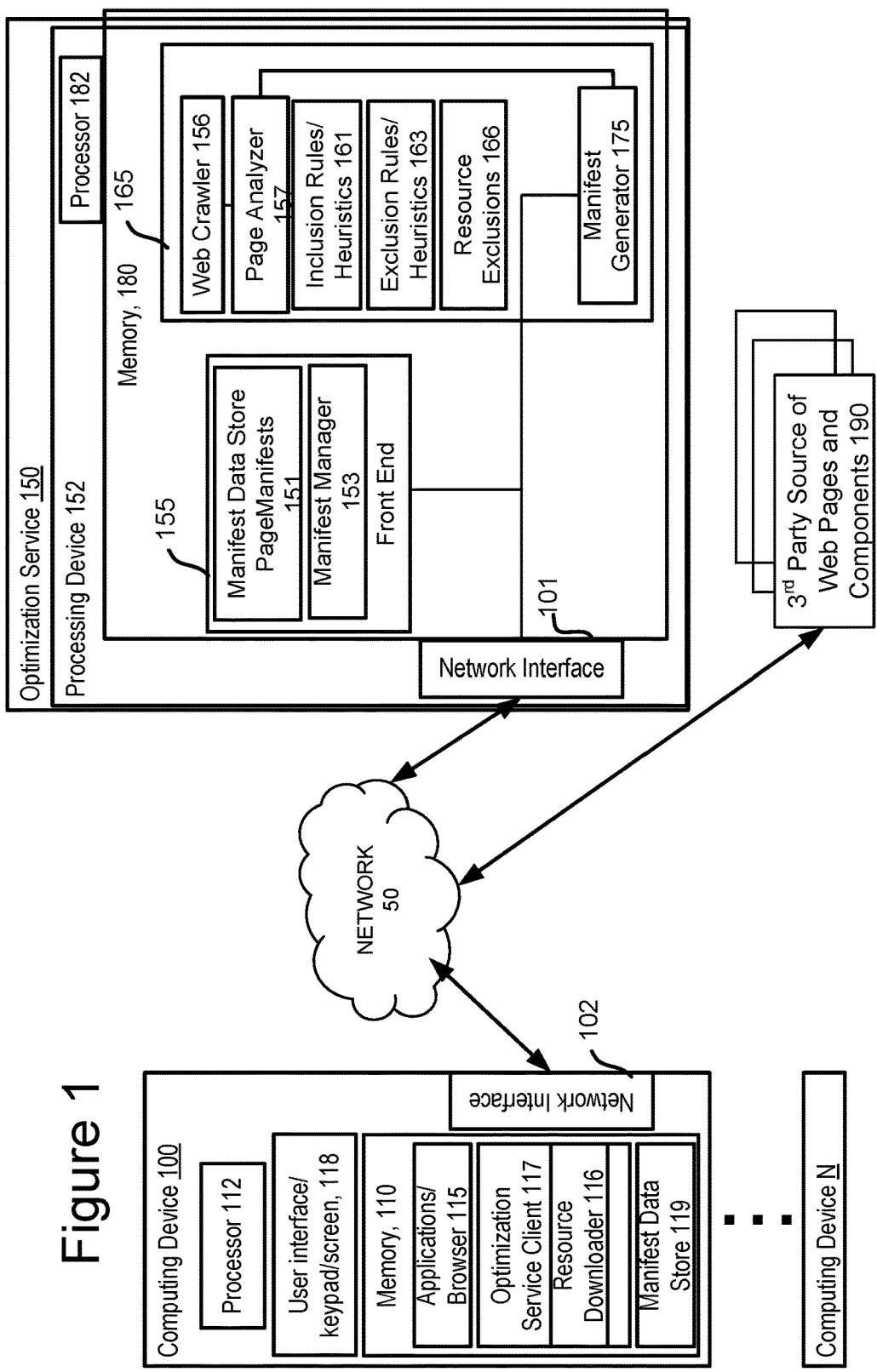
FIG. 1 depicts an exemplary processing environment for performing the technology.

FIG. 1 illustrates the exemplary processing environment in which the technology discussed herein may be implemented. A plurality of network connected computing devices 100 through 100N are connected to a network 50 via network interface 102. The devices 100-100N communicate with optimization service 150, which may include one or more processing devices 152. Accessible via the network 50 are any number of third-party sources 190 (or network sources) of web pages including a plurality of resources and components. (Only one network connected processing device 100 is illustrated in detail. It may be understood that any number of network connected computing devices 100 may operate in the environment. Similarly any number of $3^{rd}$ party web pages and components and sources of components are accessible by network 50) Computing devices 100-100$n$ may be a computing device such as that illustrated in respect to FIGS. 8 and 9, discussed herein, or any of a number of different types of computing devices which include applications connected to and retrieving web pages and components from third party sources 190. Optimization service 150 may include any number of processing devices 152 (only one of which is illustrated in FIG. 1), which may be implemented by any of the processing devices discussed herein. Computing devices 100 may mobile computing devices, or any other devices illustrated herein, including, for example, personal computers, network computers, note- or ultra-books, network personal computers, tablets, mobile phones, application enabled music devices and the like. Network interface want to connect to a collection of public and private networks 50. Network 50, may be, in one embodiment, the Internet.

In general, and as will be discussed further below, when and application 115 (i.e. a web browser) requests a third-party web page comprising a plurality of page resources and components, the request is intercepted by a service client 117 which determines, based on the manifest, whether to forward the request to the $3^{rd}$ party source 190. The manifest will include a block list of components on the web page, and requests for each of the components in the web page will be locked, rendering only components which are defined as unblocked in the manifest on the committee device 100. This reduces network traffic between the third-party web pages and the pain device 100. The technology is strictly useful in mobile computing departments were computing device 100 is a mobile computing device, since this substantially reduces the amount of network traffic, which is utilized when retrieving and wondering web pages. Will be understood that the discussion of the competing environment shown in FIG. 1 is exemplary only, and various alternatives to the competing environment illustrated in FIG. 1 will be discussed herein.

Computing device 100 may include, for example, a processor 112, a user interface, keypad, and screen 118, and a memory 110. The memory 110 is shown in one instance as including applications 115 capable of accessing and rendering web pages. Such applications may include a dedicated web browser as well as other applications which incorporate browser rendering capability such as RSS readers and social media clients. Memory 110 in this instance also includes a service client 117, a resource downloader, and a manifest data store 119. The data store 119 may includes a plurality of manifests which are utilized to specify elements of the third-party web pages and components, 190 which are to be blocked for retrieval by browser or applications 115.

In one alternative, no manifest data store is present and manifests are downloaded and used at each request for a web page. In another alternative, manifests previously downloaded and used are stored in data store 119 until their time to live expires. In another alternative, manifests may be created for high traffic pages based on user access to the optimization service and such web page manifests pre-stored in data store 119.

Web pages are generally accessed via a uniform resource locator (URL). Third-party web pages may each have a web page definition specifying a number of elements contained in the web page and a page layout. Elements which may be included in a web page include, for example, text, images, audiovisual components, third-party renderings elements such as Adobe Flash, videos, and the like. Each of the components may be accessed and retrieved relative to an address specified in the web page definition. In many cases, the elements and components are retrieved from different sources than the source of the page itself. For example, advertising components for web pages may be provided by advertising companies via a uniform resource parties than the party which to find a web page Each of the elements and components defined in the a page can be considered an element which makes blocked by technology herein.

Processor 112 interacts with memory 110 responsive to user interface, keypad and screen 118 to implement instructions to perform the methods described herein. Memory 110 may be a form of computer readable media, and may include volatile and nonvolatile memory. Service client 117 may be a collection of hardware and/or software, which interacts with network interface 102 and receives calls from the applications 115 to implement the methods described herein. Will be understood that illustration shown in FIG. 1 where service client 117 is a separate component is only one embodiment for implementing the technology. The functions of the service client 117 and resource downloader 116 may be integrated into the application, browser, or the network interface.

Optimization service 150 includes at least a processing device 152. In various embodiments, the processing device 152 may be collection of processing devices which are addressable by reference to a single network address or URL. Processing device 152 includes a processor 182, and memory 180. Memory 180 may be a collection of volatile and/or nonvolatile memory which includes components illustrated in FIG. 1. A front end component 155 includes a manifest data store, housing a number of page manifests 151 and a manifest manager 153. A manifest creator component 165 may include, for example, a web crawler 156, a page analyzer 157, inclusion rules and heuristics 161, exclusion rules and heuristics 163, resource exclusions 166, and manifest generator 175. Processing device 152 further includes a network interface 101, which communicates with the network 50.

Front end components 155 receive manifest requests from any of a number of service clients 117 via network 50. Manifest manager 153 responds to queries from the service client 117 on various computing devices 100 when a request for a manifest is received by the front end component 155. Manifest data store 151 includes a plurality of existing page manifests which have been created by the manifest generator 175. A manifest is generated for each third-party web page available from third party sources 190. When a request is received, if a manifest is available in data store 151, it may be returned in response to the request. If a manifest is not available, a new manifest is generated by manifest generator 175.

The manifest generator 175 may perform the functions described below with respect to generating page manifests for third-party web pages. Inclusion rules and heuristics 161, and exclusion rules and heuristics 163, and resource exclusions 166 are utilized by the manifest creation process described herein to determine which components of a third-party web page will be blocked from retrieval as specified in a manifest. WebCrawler 156 can be utilized in conjunction with page analyzer 157 to analyze web pages which the system determines are repeatedly browsed by the plurality of computing devices accessing the front end 155 and requesting manifests. The web crawler may be used to access pages for which manifests are regularly requested to retrieve page definitions of the page. The page analyzer determines, based on access to page, which pages may merit pre-creation of manifests. This allows the optimization service to have a fresh manifest ready when requested by computing device 100. The page analyzer also determines, based on the data in inclusion rules and heuristics 161, and exclusion rules and heuristics 163, and resource exclusions 165, what elements of the web pages should be included and excluded and provides such information to the manifest generator.

It will be recognized that the specification of different functional components and rules in blocks 155 and 165 is arbitrary, and the functional components of the methods described herein may be divided differently and/or specifically programmed in a hardware implementation.

In accordance with the technology, manifests are relatively small in size, on the order of 2 KB MB, while web pages are significantly larger. In a further embodiment, manifests may be compressed using standard compression resources and techniques (such as, for example, gzip). This means that when a call for a web page is generated by computing device 100, the web page will not be returned to the computing device before the manifest reaches device, even in cases where manifests are not present in the manifest data store 119.

Each manifest can include a time to live (TTL) during which the manifest is still consider valid. In some embodiments, this allows a second or subsequent request to a web page from a processing device to use the same manifest stored in data store 119. It should be noted that in one embodiment, no TTL is included in a manifest and a new manifest is downloaded for each request to a web page. In alternative embodiments, calls for popular web pages which are known to be regularly browse by other users of the optimization service 150 can be preloaded into the manifest is store 119. Similarly, manifests may be prepared and stored in optimization service 151 or dynamically generated for each page for each request received by service 150.

Figure 2:
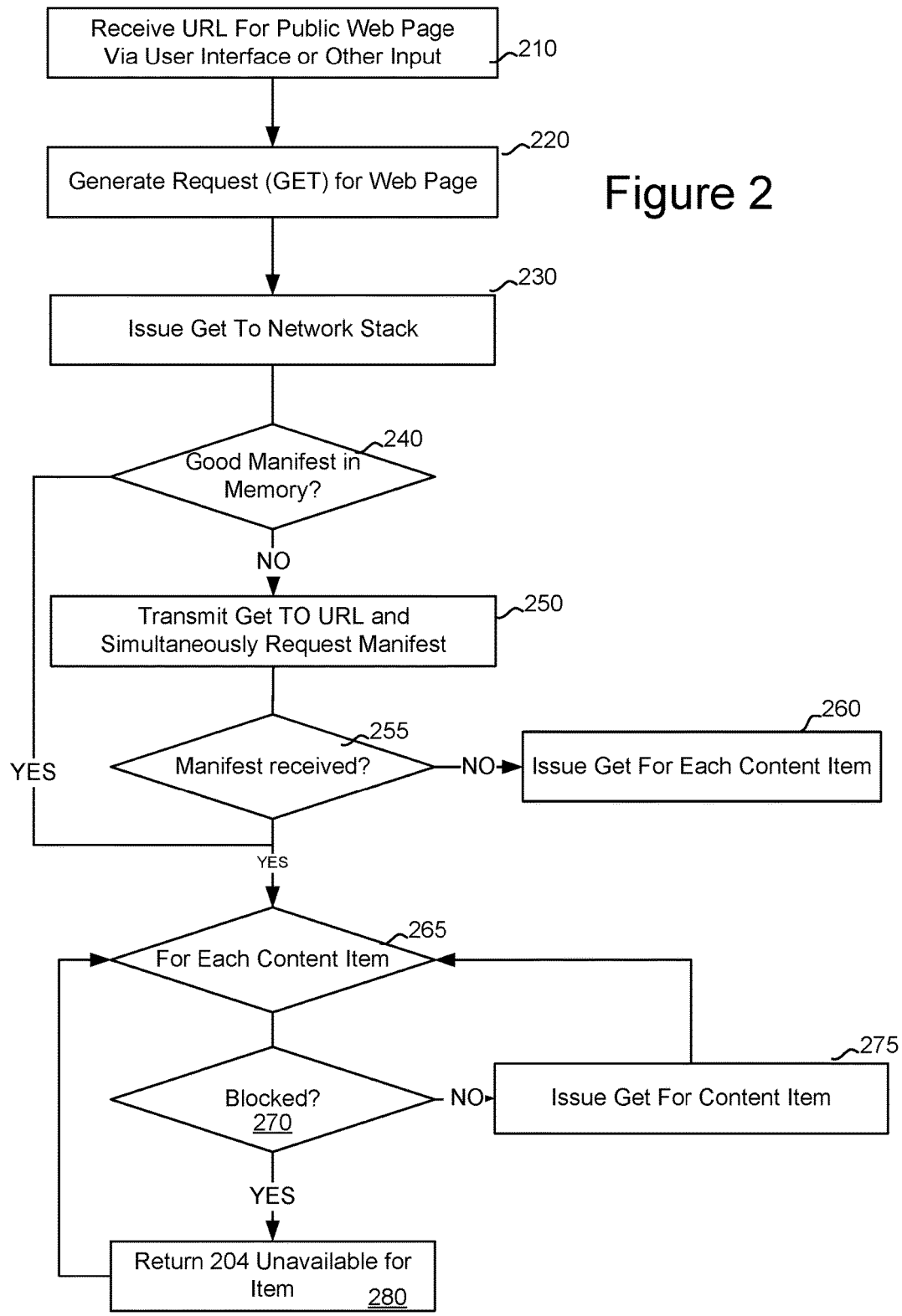
FIG. 2 is a flow diagram depicting one embodiment of a method performing the present technology on a rendering processing device.

FIG. 2 is a flow chart illustrating one method of performing the present technology. FIG. 2 illustrates a method occurring on a processing device 100-100N. At 210, a request for a web page is received. The request may take the form of a URL and may be received via a user interface via a web browser or from any of a number of different types of application running on processing device 100. The URL generally specifies any available web page accessible via network 50.

Figure 5:
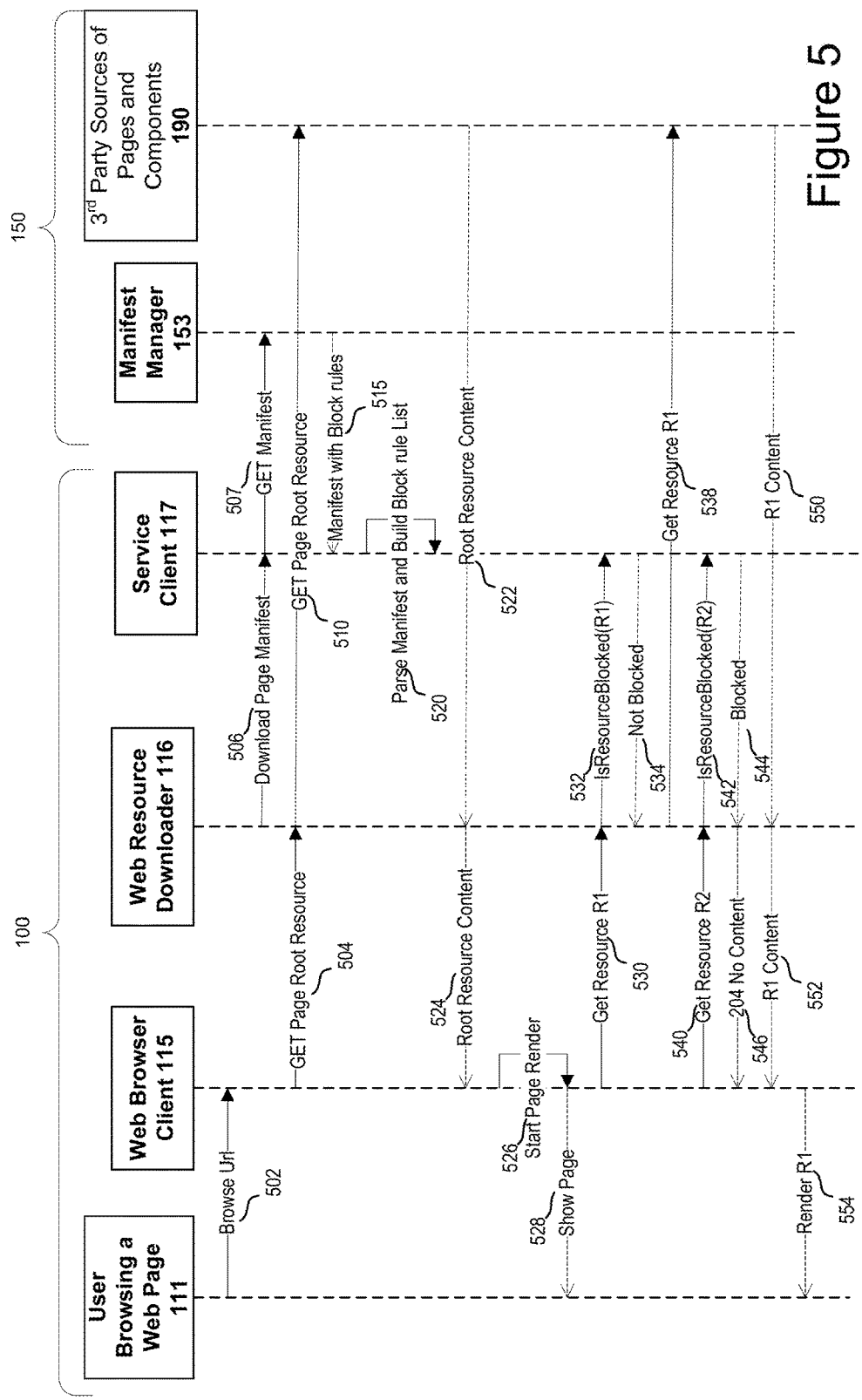
FIG. 5 is an exemplary sequence diagram illustrating retrieval of a manifest and rendering of a web page.

At step 220, a request for the root web page is generated. The root page is a root definition of the web page. The request can take the form of an HTTP get for the uniform resource locator identifying the web page. At 230, the request is output to the network, and in one embodiment intercepted by the service client and resource downloader. One example of the particular sequence is illustrated in FIG. 5. To the application, the service client appears as a network request. Hence, applications can be created based on generally accepted HTTP and other network protocols. At 240, an initial determination was made as to whether not a good manifest for the particular web page is in the memory of the processing device. In this case, the good manifest if available would be maintained in the manifest data store 119. As noted above, each manifest or the manifest to store 119 can have a time to life indicator denoting how long the manifest is available for use by the client processing device 100. If a good manifest available, the method proceeds to step 265 to proceed with downloading content items. If no good manifest is in memory, then a request for the manifest will be issued at 250 simultaneously with a request to the web page for the web page URL. Although the request for the manifest and the request for the web page are issued simultaneously, because the request for the manifest is retrieving a significantly smaller data file than the web page, it is generally likely the manifest will return more quickly than the definition and any components of the web page. Until and unless the manifest is received at 255, the method will proceed with issuing requests for the web page and any and all content items in the web page at 260. Thus, if for any reason the optimization service does not return a manifest, access to the web page is not interrupted.

At 265, once the manifest is received, or if good manifest is in memory 240, for each content item, a determination is made at 270 as to whether the content item is blocked from retrieval by matching items identified in the manifest with components requested in the web page. If the content element is blocked, then an HTTP 204 "No Content" status is returned at 280. If the content is not blocked, then a specific request (HTTP GET) to the $3^{rd}$ party source of the content element for the content will be issued at 275.

Figure 3:
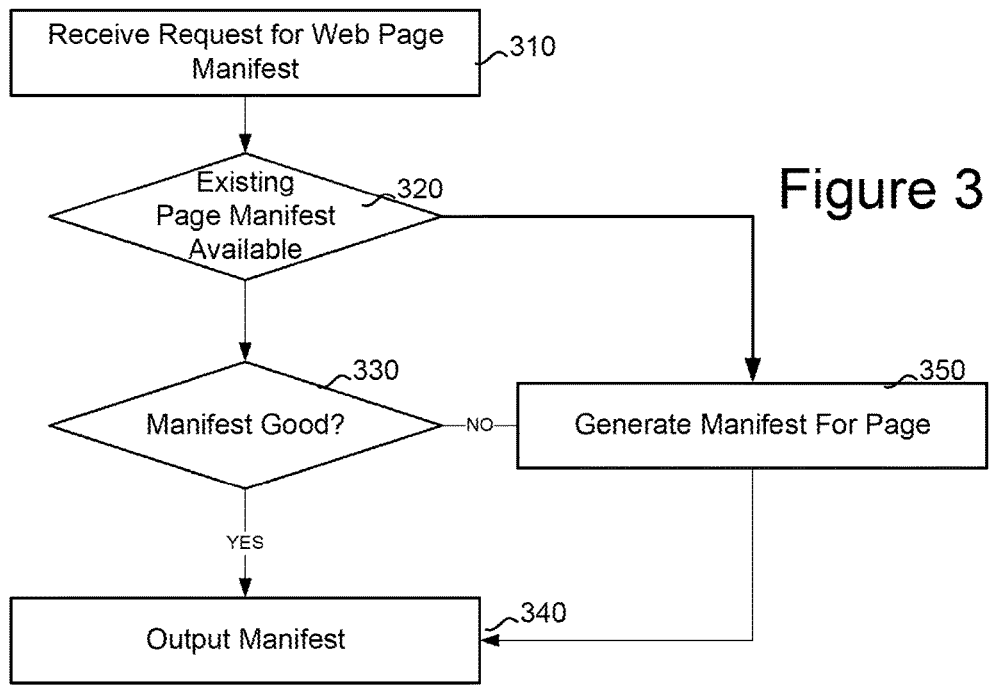
FIG. 3 is a flow diagram depicting a method performed by an optimization service.

FIG. 3 illustrates a method which may be performed by the optimization service when receiving a request for manifest. At 310, a request for manifests is received. In one embodiment, the request is received by the manifest manager 153. At 320, a determination made as to whether not an existing manifest is available in the manifest store and if so, at 330, whether the TTL of the manifest indicated that the manifest for the web page is still good. In one embodiment, the manager 153 may query the manifest data store 151 to determine the presence of a manifest for the web page and the TTL of the manifest. If manifest is not live or if no existing manifest is available at 320, then a manifest generation process 350 is performed. A good manifest for the web page is output at 34 and returned to the requesting processing device via the network interface 101 and interface 102. Optionally, the manifest may be stored in the manifest data store at 151.

FIG. 4 illustrates one method of creating a manifest at step 350. Initially, at 410, the root web page is parsed to determine which resource elements are to be called in rendering the web page. At 415, an aggressiveness factor is determined. The aggressiveness factor is optional. The aggressiveness factor may be a specification by a user of a processing device 100 allowing the user to indicate how aggressive the blocking of elements in a page will be. The aggressiveness factor may be a relatively coarse setting such as "high" and "low" aggressiveness, or be a numerical scale of ranked aggressiveness with various levels of granularity in specifying aggressiveness. The aggressiveness factor may determine which elements of a web page are blocked. For example, a "low" aggressiveness factor may block only well-known advertisement sources, while a "high" aggressive rank may block all elements except text content.

At 420, for each element in the web page definition, a determination is made as to whether or not the element should be blocked. At 430, inclusion rules and heuristics are matched to the element. At 435, inclusion rules and heuristics are analyzed and at 440, blocked resources are analyzed. The exclusion rules and heuristics may comprise an analysis of characteristics of the web page which are known to be of little interest to a requesting user. The heuristics and rules may block items based on, for example, the known size of a resource (large resources have a greater chance of being blocked), the placement of the resource in the layout on the page (items at the bottom and sides of the page layout may be of less importance and more subject to blocking), the source of the content (known advertising sources may be blocked), and characteristics of the URL.

Inclusion rules 435 specify items which should be included for download irrespective of the exclusion rules and heuristics. Blocked resources may specify URLs or types of resources (by file type or other indicator) which should always be blocked. The process repeats at 445 for each resource in the web page.

At 450, a time to life in manifest is established. The time to life is established based on the frequency with which, for example, the target page is updated. Certain web pages, for example those of news reporting sites, update on a very frequent basis—several times an hour. Other types of pages, for example those of "flash sale" sites, update only once daily. Hence, time to life can be established which reflects the nature of web page being accessed. Once the time to life established, the manifest is generated at 455 and output at 460.

While FIG. 2 presented a general method, FIG. 5 illustrates one exemplary sequence of the communications between a processing device 100 and the components thereof, and the optimization service 150. In the example shown in FIG. 5. A user browsing web page 111 may initiates the sequence by specifying a browsing URL 502 in the user interface of a web browser client application 115. In accordance with known techniques, the browser application 115 issues an HTTP GET request 504 for the root page resource. This request is received by the web resource downloader which issues both a page manifest download request and an HTTP GET for the root page resource 510. The service client creates a GET manifest call 507 to the manifest manager 153, which quarries the manifest store 151 for the manifest document or initiates the manifest creation process as note above with respect to FIGS. 2 and 3. At 515, the manifest for the specific root page requested is returned. At 517, the manifest is parsed and a block list created for the web resource downloader 116.

The root resource content is returned at 524 to the resource downloader 116 to the web browser client 115 at 524. Page rendering then begins 526 and the page begins to display at 528 by the browser application 115 to the user 111 on the user interface. When the browser application 115 initiates a request for first resource (R1) of the web page at 530, the resource request is forwarded by the resource downloader at 532 to the service client 117. For resource R1, the reply at 534 is that the resource R1 is not blocked and the web resource downloader issues a GET R1 request 538 to the third party source of the resource 190. The resource R1 is returned at 550 and its content provided from the downloader 116 to the browser application 115 at 552. The resource R1 can be rendered at 554. A second resource R2 is requested at 540 which is forwarded to the service client at 542. In this instance, the reply 544 is that resource R2 is blocked and hence a status 204 indication 546 is provided to the browser application.

FIG. 6 illustrates an exemplary manifest specification generated in an XML format. Although XML is presented as the source language, other forms of manifests may be used. As illustrated therein, an exemplary manifest includes a do not render portion 602 and an override list 630. The do not render portion 602 includes do not render rules 605 identifying characteristics of URLs which should not be rendered. Also listed are domains 610 and extensions 620 which are not to be rendered. In the example shown in FIG. 6, "EXE" files, "MP3" files, and "MPG" files are all blocked. Also shown in FIG. 6 is the exception list 630 including rules 640 and domains 650. The override list is effectively a whitelist for certain types of characteristics of a URL at 640, or a particular domain at 650.

Figure 7:
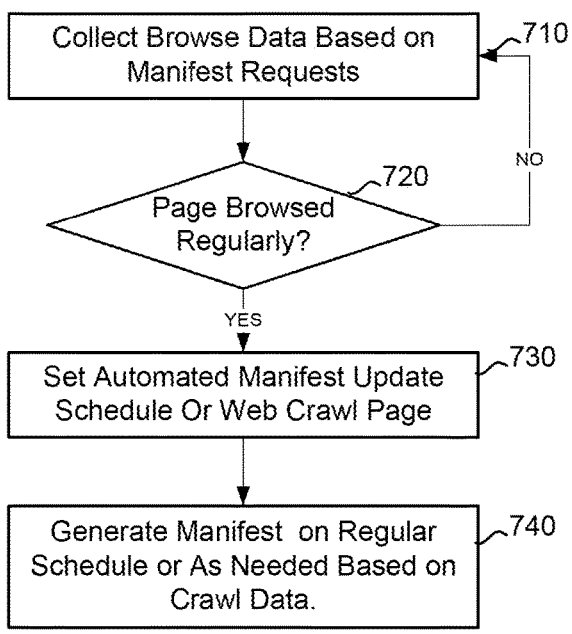
FIG. 7 is a flow chart illustrating a process for creating manifests of regularly accessed web pages.

FIG. 7 illustrates a method for analyzing a set of web pages based on a global acquisition of user data. The optimization service will receive a plurality of requests from any number of computing devices 100 over time and via page analyzer 157 may determine to regularly generate or pre-generate manifests which can be returned to processing devices when requested.

At 710 browsing data in the form of manifest requests is collected and analyzed. At 720, a determination made as to whether not the web page is browsed sufficiently frequently or regularly to justify a regular generation or periodic generation of a manifest associated with the web page. If not, the collection continues at 710. If so, then at 730, and automated manifest update process is initiated. The audit mated manifest update processes 730 can occur regularly, or, using the web crawler discussed above with respect to FIG. 1, can occur when an update for the page is detected. At 740, the manifest is generated on the regular schedule or as needed based on the determination at 730 and in accordance with the process discussed above with respect to FIG. 3.

Figure 8:
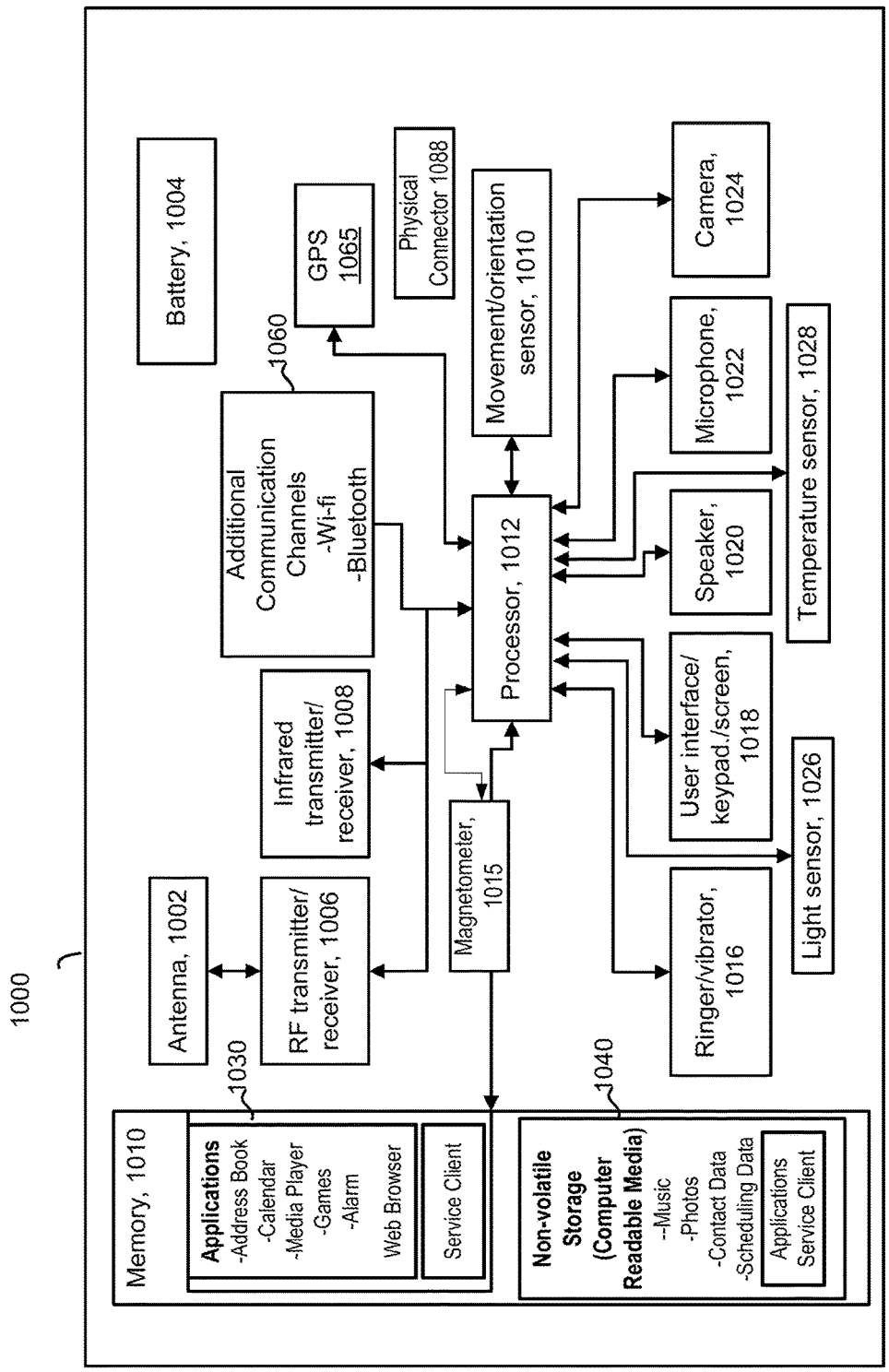
FIG. 8 is a block diagram of a first embodiment of a processing device.

FIG. 8 depicts an example block diagram of a mobile device for implementing the operations of the disclosed technology. Exemplary electronic circuitry of a typical mobile phone is depicted. The mobile device 1000 includes one or more microprocessors 1012, and memory 1010 (e.g., non-volatile memory such as ROM and volatile memory such as RAM) which stores processor-readable code which is executed by one or more processors of the control processor 1012 to implement the functionality described herein.

Mobile device 1000 may include, for example, processors 1012, memory 1010 including applications and non-volatile storage. The processor 1012 can implement communications, as well any number of applications, including the applications discussed herein. Memory 1010 can be any variety of memory storage media types, including non-volatile and volatile memory. A device operating system handles the different operations of the mobile device 1000 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, an alarm application or other third party applications. The non-volatile storage component 1040 in memory 1010 contains data such as web caches, music, photos, contact data, scheduling data, and other files.

The processor 1012 also communicates with RF transmit/receive circuitry 1006 which in turn is coupled to an antenna 1002, with an infrared transmitted/receiver 1008, and with a movement/orientation sensor 1014 such as an accelerometer and a magnetometer 1015. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1012 further communicates with a ringer/vibrator 1016, a user interface keypad/screen 1018, a speaker 1020, a microphone 1022, a camera 1024, a light sensor 1026 and a temperature sensor 1028. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 1012 controls transmission and reception of wireless signals. During a transmission mode, the processor 1012 provides a voice signal from microphone 1022, or other data signal, to the transmit/receive circuitry 1006. The transmit/receive circuitry 1006 transmits the signal to a remote station (e.g., a fixed station, operator, other cellular phones, etc.) for communication through the antenna 1002. The ringer/vibrator 1016 is used to signal an incoming call, text message, calendar reminder, alarm clock reminder, or other notification to the user. During a receiving mode, the transmit/receive circuitry 1006 receives a voice or other data signal from a remote station through the antenna 1002. A received voice signal is provided to the speaker 1020 while other received data signals are also processed appropriately.

Additionally, a physical connector 1088 can be used to connect the mobile device 100 to an external power source, such as an AC adapter or powered docking station. The physical connector 1088 can also be used as a data connection to a computing device. The data connection allows for operations such as synchronizing mobile device data with the computing data on another device. A global positioning service (GPS) receiver 1065 utilizing satellite-based radio navigation to relay the position of the user applications is enabled for such service.

Figure 9:
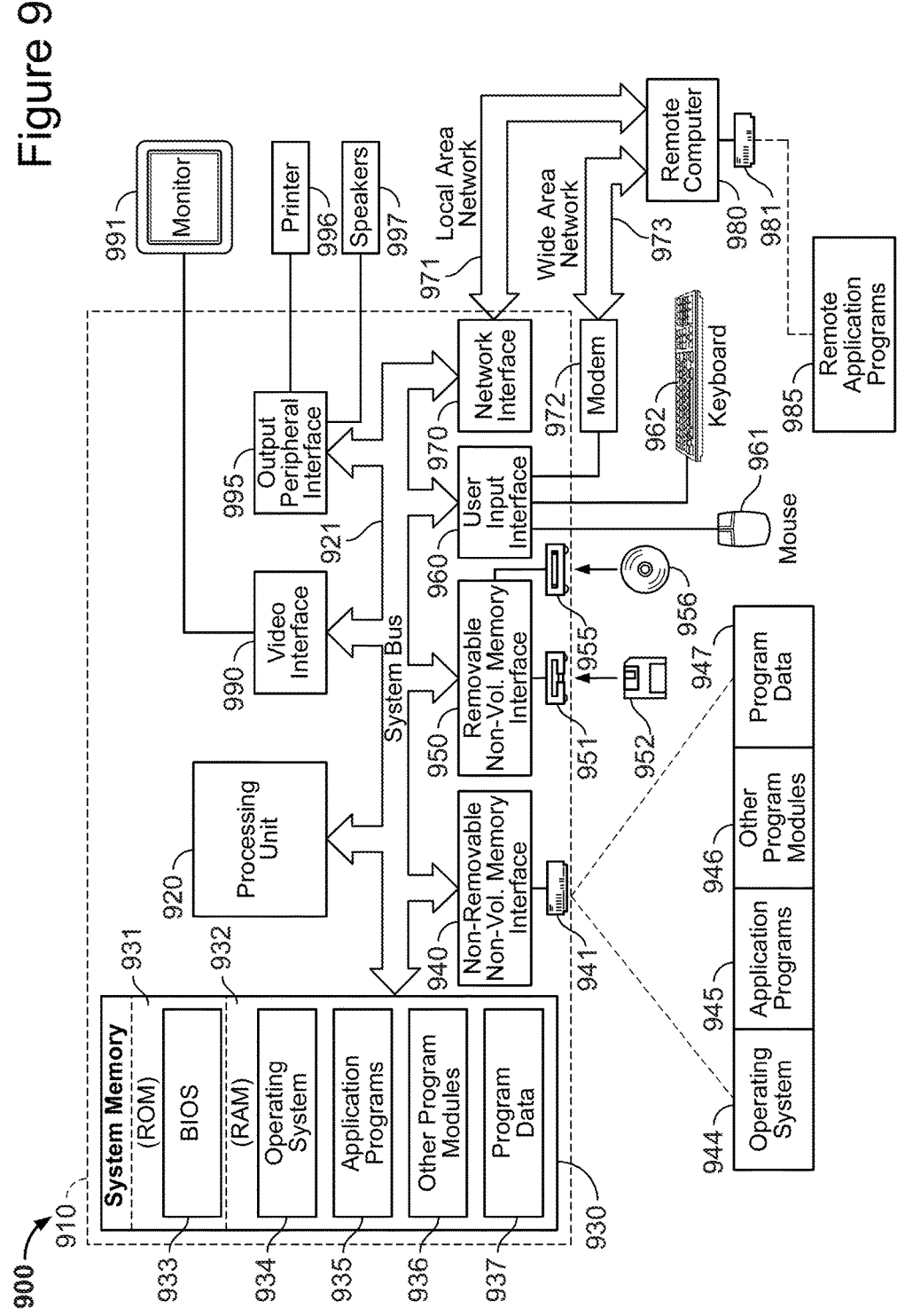
FIG. 9 is a block diagram of a second embodiment of a processing device.

FIG. 9 depicts an example block diagram of a mobile device for implementing the operations of the disclosed technology. The device of FIG. 10 is a more detailed illustration of, for example, devices 102, 104 of FIG. 1. Exemplary electronic circuitry of a typical mobile processing device is depicted. The mobile device 1000 includes one or more microprocessors 1012, and memory 1010 (e.g., non-volatile memory such as ROM and volatile memory such as RAM) which stores processor-readable code which is executed by one or more processors of the control processor 1012 to implement the functionality described herein.

Mobile device 1000 may include, for example, processors 1012, memory 1010 including applications and non-volatile storage. The processor 1012 can implement communications, as well any number of applications, including the applications discussed herein. Memory 1010 can be any variety of memory storage media types, including non-volatile and volatile memory. A device operating system handles the different operations of the mobile device 1000 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, an alarm application or other third party applications. The non-volatile storage component 1040 in memory 1010 contains data such as web caches, music, photos, contact data, scheduling data, and other files.

The processor 1012 also communicates with RF transmit/receive circuitry 1006 which in turn is coupled to an antenna 1002, with an infrared transmitted/receiver 1008, and with a movement/orientation sensor 1014 such as an accelerometer and a magnetometer 1015. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1012 further communicates with a ringer/vibrator 1016, a user interface keypad/screen 1018, a speaker 1020, a microphone 1022, a camera 1024, a light sensor 1026 and a temperature sensor 1028. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 1012 controls transmission and reception of wireless signals. During a transmission mode, the processor 1012 provides a voice signal from microphone 1022, or other data signal, to the transmit/receive circuitry 1006. The transmit/receive circuitry 1006 transmits the signal to a remote station (e.g., a fixed station, operator, other cellular phones, etc.) for communication through the antenna 1002. The ringer/vibrator 1016 is used to signal an incoming call, text message, calendar reminder, alarm clock reminder, or other notification to the user. During a receiving mode, the transmit/receive circuitry 1006 receives a voice or other data signal from a remote station through the antenna 1002. A received voice signal is provided to the speaker 1020 while other received data signals are also processed appropriately.

Additionally, a physical connector 1088 can be used to connect the mobile device 100 to an external power source, such as an AC adapter or powered docking station. The physical connector 1088 can also be used as a data connection to a computing device. The data connection allows for operations such as synchronizing mobile device data with the computing data on another device. A global positioning service (GPS) receiver 1065 utilizing satellite-based radio navigation to relay the position of the user applications is enabled for such service.

FIG. 11 illustrates an example of a suitable computing system environment 900 such as personal computer on which the technology may be implemented. The computing system environment 900 is only one example of a suitable computing environment and is not intended to suggest any limitation as to the scope of use or functionality of the technology. Neither should the computing environment 900 be interpreted as having any dependency or requirement relating to any one or combination of components illustrated in the exemplary operating environment 900.

In one embodiment, the system of FIG. 9 or multiples thereof may be used to provide the location service 150.

Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable medium or media. Computer readable media can be any available media that can be accessed by computer 910 and includes both volatile and nonvolatile media, removable and non-removable media. By way of example, and not limitation, computer readable media may comprise computer storage. Computer storage media includes both volatile and nonvolatile, removable and non-removable media for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 939.

The computer 910 may also include other tangible removable/non-removable, volatile/nonvolatile computer storage media. By way of example only, FIG. 9 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 949. Note that these components can either be the same as or different from operating system 934, application programs 935, other program modules 936, and program data 939. Operating system 944, application programs 945, other program modules 946, and program data 949 are given different numbers here to illustrate that, at a minimum, they are different copies. A user may enter commands and information into the computer 20 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 999 and printer 996, which may be connected through a output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 991 and a wide area network (WAN) 993, but may also include other networks. Such networking environments are commonplace in offices, enterprise-wide computer networks, intranets and the Internet.

When used in a LAN networking environment, the computer 910 is connected to the LAN 991 through a network interface or adapter 990. When used in a WAN networking environment, the computer 910 typically includes a modem 992 or other means for establishing communications over the WAN 993, such as the Internet. The modem 992, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Embodiments of the technology include a processing device adapted to render a web page. The processing device includes a user interface and a memory said memory area storing a manifest associated with a web page; and a processor. The processor may be programmed to receive a request to render the web page available from a network source, the web page including plurality of elements, each of the plurality retrievable in response to a request for the element; retrieve a page manifest for the web page, the manifest specifying ones of the plurality of elements of the web page which will not be returned in response to the request for the element; block, in response to the manifest, at least one request for one of the plurality of elements in the web page; and render the web page with a subset of the plurality of elements on the user interface.

Embodiments include a processing device as described above wherein the processor is programmed to retrieve a page manifest in response to each request to render a web page.

Embodiments include a processing device as in any of the above described embodiments wherein the processor is programmed to retrieve a page manifest from an optimization service via a network, the retrieving comprising requesting a page manifest in response to the request to render the web page.

Embodiments include a processing device as in any of the above described embodiments wherein the processor is programmed to retrieve a page manifest from a data store, the page manifest having a time to live indicator denoting whether the page manifest is valid.

Embodiments include a processing device as in any of the above described embodiments wherein the processor is programmed to build a block list to block by analyzing the page manifest relative to the web page, wherein the at least one request for one of the plurality of elements is received by the processor, the at least one request is blocked from reaching the source.

Embodiments include a processing device as in any of the above described embodiments wherein the processor is programmed to return a no content message in response to the at least one request for one of the plurality of elements.

Embodiments include a processing device as in any of the above described embodiments wherein the web page includes a root definition, and wherein the request to render the web page is delivered to the network source, the root definition is returned in response to the request to render the web page, and the at least one request for one of the plurality of elements is based on the root definition.

In addition, a computer implemented method is provided. The method includes, for example, receiving a request for a web page from a network source, the web page having a root definition specifying a plurality of resources, each of the plurality of resources retrievable in response to a request to the network source; analyzing a data file specifying blocked and allowed ones of the plurality resources, the data file including at least one block rule for at least one resource specified in the root definition; receiving a request for a first resource of the plurality of resources; determining whether to block the request based on the analyzing and if so, blocking the request; and rendering the web page including unblocked resources.

Embodiments include a computer implemented method as discussed above further including retrieving a data file in response to each request for the web page.

Embodiments include a computer implemented method of any of the previous embodiments wherein the data file is retrieved from an optimization service via the network, the retrieving comprising requesting a page manifest in response to the request to render the web page.

Embodiments include a computer implemented method of any of the previous embodiments wherein retrieving includes retrieving a page manifest from a data store, the page manifest having a time to live indicator denoting whether the page manifest is valid.

Embodiments include a computer implemented method of any of the previous embodiments further including simultaneously forwarding the request for the web page to the network source and a request for the data file to an optimization service.

Additional embodiments include a computer readable medium including code instructing a processor to perform a method. The method may comprise receiving a request for a web page manifest, the manifest for a web page having a plurality of resources specified in the web page by reference to network addresses; analyzing the web page to create a page manifest, the analyzing determining blocked and unblocked resources from a root definition of the web page specifying a plurality of resources; generating the page manifest responsive to said analyzing; and outputting the page manifest in response to the request.

Embodiments include a computer readable medium and method of any of the previous embodiments wherein the analyzing comprises determining at least one of the plurality of resources comprising a blocked resource.

Embodiments include a computer readable medium and method wherein the analyzing comprises determining at least one of the plurality of resources comprising a allowed resource.

Embodiments include a computer readable medium and method further including specifying a time to live for the page manifest.

Embodiments include a computer readable medium and method wherein the receiving includes receiving a request from a network coupled processing device, the plurality of resources being accessible by the processing device via the network.

Embodiments include a computer readable medium and method 13 wherein generating occurs for each request for a web page.

Embodiments include a computer readable medium and method wherein the method further includes pre-generating web page manifests for web pages having greater a threshold number of requests.

Embodiments include a computer readable medium and method wherein the manifest includes at least one exclusion rule and one inclusion rule Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a request to render a web page that includes a plurality of elements;
retrieving a manifest that is specific to the web page, the manifest specifying one or more elements of the plurality of elements that are not to be included in a rendering of the web page;
blocking a request for a designated element of the one or more elements from being sent via a network to a source of the designated element based at least in part on the manifest specifying the designated element; and
generating the rendering of the web page to not include the one or more elements that are specified by the manifest based at least in part on blocking the request for the designated element from being sent via the network to the source of the designated element.

2. The method of claim 1 wherein retrieving the manifest comprises:
retrieving the manifest via the network based at least in part on receipt of the request to render the web page.

3. The method of claim 1, further comprising:
returning a no content message in lieu of the designated element in response to the request for the designated element based at least in part on the manifest specifying the designated element.

4. The method of claim 1, wherein the web page includes a root definition;
wherein the method further comprises:
sending the request to render the web page to a source of the root definition; and
receiving the root definition in response to the request to render the web page; and
wherein the request for the designated element is based on the root definition.

5. The method of claim 1, wherein retrieving the manifest comprises:
retrieving the manifest from a plurality of manifests that are defined on a per-web page basis, each manifest of the plurality of manifests is specific to a respective web page of a plurality of web pages, each manifest specifies at least one element of the respective web page that is not to be included in a rendering of the respective web page.

6. The method of claim 1, wherein the manifest specifies the one or more elements that are not to be retrieved via the network.

7. The method of claim 1, wherein the manifest is based on exclusion rules defining a specified element to be blocked based on at least one of (a) a size of the specified element, (b) placement of the specified element on the web page, or (c) one or more characteristics of a uniform resource locator associated with the specified element.

8. The method of claim 1, wherein receiving the request to render the web page comprises:
receiving the request to render the web page at a computing device;
wherein the method further comprises:
determining that no manifest for the web page is in memory of the computing device; and
wherein retrieving the manifest comprises:
providing a request for the manifest simultaneously with a request to the web page for a uniform resource locator of the web page based at least in part on a determination that no manifest for the web page is in the memory of the device.

9. A computing device comprising:
memory; and
one or more processors coupled to the memory, the one or more processors configured to:
request download of a data file via a network based at least in part on receipt of a request to render a web page, the web page having a root definition specifying a plurality of resources, the data file including at least one exclusion rule indicating that one or more designated resources that are included in the plurality of resources are not to be included in a rendering of the web page, the data file further including an inclusion rule indicating that at least one designated resource of the one or more designated resources is to be included in the rendering of the web page irrespective of the exclusion rule;
analyze the data file to identify which of the plurality of resources are not to be included in the rendering of the web page;
determine whether to block a request for a first resource of the plurality of resources from being sent via a network to a source of the first resource based at least in part on analyzing the data file and if so, block the request; and
generate the rendering of the web page to include the at least one designated resource based at least in part on the inclusion rule indicating that the at least one designated resource is to be included in the rendering of the web page irrespective of the exclusion rule.

10. The computing device of claim 9, wherein the data file is a page manifest; and
wherein the one or more processors are configured to retrieve the page manifest from an optimization service via the network.

11. The computing device of claim 10, wherein the data file is a page manifest; and
wherein the one or more processors are configured to retrieve the page manifest from a data store, the page manifest having a time to live indicator denoting whether the page manifest is valid.

12. The computing device of claim 10, wherein the one or more processors are configured to simultaneously forward the request to render the web page and a request for the page manifest to the optimization service.

13. The computing device of claim 9, wherein the data file is specific to the web page.

14. A system comprising;
memory; and
one or more processors coupled to the memory, the one or more processors configured to:
receive a request for a web page manifest via a network, the web page manifest associated with a web page having a plurality of resources specified in the web page by reference to network addresses;
create the web page manifest, which is specific to the web page, based on an analysis of the web page, the manifest specifying one or more blocked resources of the web page that are not to be returned upon a request for web page resources and further specifying one or more unblocked resources that are to be returned upon a request for web page resources; and
provide the web page manifest via the network in response to the request.

15. The system of claim 14, wherein the one or more processors are configured to specify a time to live for the web page manifest.

16. The system of claim 14, wherein the plurality of resources is accessible via the network by a network-coupled processing device from which the request for the web page is received.

17. The system of claim 14, wherein one or more processors are configured to create a web page manifest for each request for a web page that is received via the network.

18. The system of claim 14, wherein the one or more processors are configured to pre-generate web page manifests for web pages that are browsed more frequently than a threshold frequency.

19. The system of claim 14, wherein the web page manifest includes one or more exclusion rules and one or more inclusion rules.

20. The system of claim 19, wherein at least one of the one or more inclusion rules specifies at least one resource that is to be returned upon a request for web page resources irrespective of the one or more exclusion rules.

\* \* \* \* \*